United States Patent
Yamakawa et al.

(10) Patent No.: US 8,662,242 B2
(45) Date of Patent: Mar. 4, 2014

(54) VEHICLE STEERING SYSTEM

(71) Applicant: JTEKT Corporation, Osaka (JP)

(72) Inventors: Tomonari Yamakawa, Aichi (JP);
Satoshi Motoyama, Knoxville, TN (US)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/759,258

(22) Filed: Feb. 5, 2013

(65) Prior Publication Data
US 2013/0213728 A1 Aug. 22, 2013

(30) Foreign Application Priority Data
Feb. 20, 2012 (JP) ................................ 2012-034140

(51) Int. Cl.
*B62D 5/04* (2006.01)
(52) U.S. Cl.
USPC ............................ 180/446; 180/443; 180/444
(58) Field of Classification Search
USPC .......................................... 180/446, 443, 444
See application file for complete search history.

(56) References Cited

U.S. PATENT DOCUMENTS

| | | | | |
|---|---|---|---|---|
| 6,840,347 B2* | 1/2005 | Nakatsu et al. | ............... | 180/444 |
| 7,306,535 B2* | 12/2007 | Menjak et al. | ................... | 475/29 |
| 7,926,613 B2* | 4/2011 | Matsuda | ....................... | 180/446 |

FOREIGN PATENT DOCUMENTS

JP    A-11-1175    1/1999

* cited by examiner

*Primary Examiner* — Joseph M Rocca
*Assistant Examiner* — Marlon Arce
(74) *Attorney, Agent, or Firm* — Oliff PLC (57) ABSTRACT

A variable transmission ratio mechanism is provided on an intermediate portion of a steering shaft, and is able to change a transmission ratio between a shaft on the steering wheel side and a shaft on the steered wheel side by transmitting the sum of rotation of the first shaft and rotation of a rotary shaft of a motor to the second shaft. The variable transmission ratio mechanism is provided with a lock mechanism that restricts the operation of the variable transmission ratio mechanism. When the fact that a rate of change in torque that acts on the steering shaft exceeds a predetermined rate is detected, a period of time until the torque that acts on the steering shaft reaches a torque determination value is estimated. On the condition that the estimated time is shorter than or equal to a predetermined period of time, the lock mechanism is activated.

4 Claims, 7 Drawing Sheets

VEHICLE STEERING SYSTEM

INCORPORATION BY REFERENCE/RELATED APPLICATION

This application claims priority to Japanese Patent Application No. 2012-034140 filed on Feb. 20, 2012 the disclosure of which, including the specification, drawings and abstract, is incorporated herein by reference in its entirety.

BACKGROUND OF THE INVENTION

1. Field of the Invention

The invention relates to a vehicle steering system that includes a variable transmission ratio mechanism that is able to change a steered amount of a steered wheel with respect to an operation amount of a steering wheel of a vehicle.

2. Discussion of Background

A conventional vehicle steering system of this type is described in, for example, Japanese Patent Application Publication No. 11-001175 (JP 11-001175 A). In the vehicle steering system described in JP 11-001175 A, a steering shaft is split into a first shaft on the steering wheel side and a second shaft on the steered wheel side. A variable transmission ratio mechanism is provided between the first shaft and the second shaft, and is able to change the transmission ratio between the first shaft and the second shaft. Note that the transmission ratio indicates the ratio of the rotation angle of the second shaft to the rotation angle of the first shaft. With such a vehicle steering system, by changing the transmission ratio on the basis of an operating state of the vehicle, it is possible to change an amount of change in the steered angle of the steered wheels with respect to the operation amount of the steering wheel. Therefore, the drivability of the vehicle improves.

In such a vehicle steering system, for example, if one of the steered wheels runs onto a curb while the vehicle is travelling and then an excess impact load acts on the steered wheel, the impact load is transmitted as reverse input torque to the variable transmission ratio mechanism via a steered system and the second shaft. If the reverse input torque acts on a motor of the variable transmission ratio mechanism and therefore a rotary shaft of the motor rotates relative to the first shaft, the correlation between the steering angle of the steering wheel and the steered angle of the steered wheels may deviate.

Therefore, in JP 11-001175 A, the state of a load of the motor is monitored, and, if the fact that the load of the motor is high is detected, rotation of the rotary shaft of the motor is restricted with the use of a lock mechanism provided in the variable transmission ratio mechanism. In this way, the operation of the variable transmission ratio mechanism is restricted. When reverse input torque acts on the motor and therefore the load of the motor becomes high, the operation of the variable transmission ratio mechanism is restricted. Therefore, the first shaft and the second shaft are directly coupled to each other. Thus, it is possible to suppress a deviation between the steering angle of the steering wheel and the steered angle of the steered wheels.

In the vehicle steering system described in JP 11-001175 A, due to a delay in response of the lock mechanism, there is a slight time lag between when the fact that the load of the motor is high is detected and when the operation of the variable transmission ratio mechanism is actually restricted. If the rotary shaft of the motor rotates relative to the first shaft during the time lag, there may be a deviation between the steering angle of the steering wheel and the steered angle of the steered wheels. This is one of factors that deteriorate the drivability of the vehicle.

SUMMARY OF THE INVENTION

The invention provides a vehicle steering system that is able to improve the drivability of a vehicle.

According to a feature of an example of the invention, a vehicle steering system includes: a variable transmission ratio mechanism that is able to change a transmission ratio between a first shaft on the steering wheel side and a second shaft on the steered wheel side by adding rotation of the motor to rotation of the first shaft and transmitting the sum of the rotation of the motor and the rotation of the first shaft to the second shaft; a lock mechanism that mechanically restricts the rotation of the motor; a torque detecting unit that detects a torque that acts on the first shaft or the second shaft; and a control unit that restricts the rotation of the motor with the use of the lock mechanism when a rate of change in the detected torque exceeds a predetermined rate.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Hereinafter, a so-called rack assist-type electric power steering system that assists a driver's steering operation by applying assist force to a rack shaft of a vehicle, which is a vehicle steering system according to a first embodiment of the invention will be described with reference to FIG. 1 to FIG. 4 and FIG. 5A to FIG. 5D.

Figure 1:
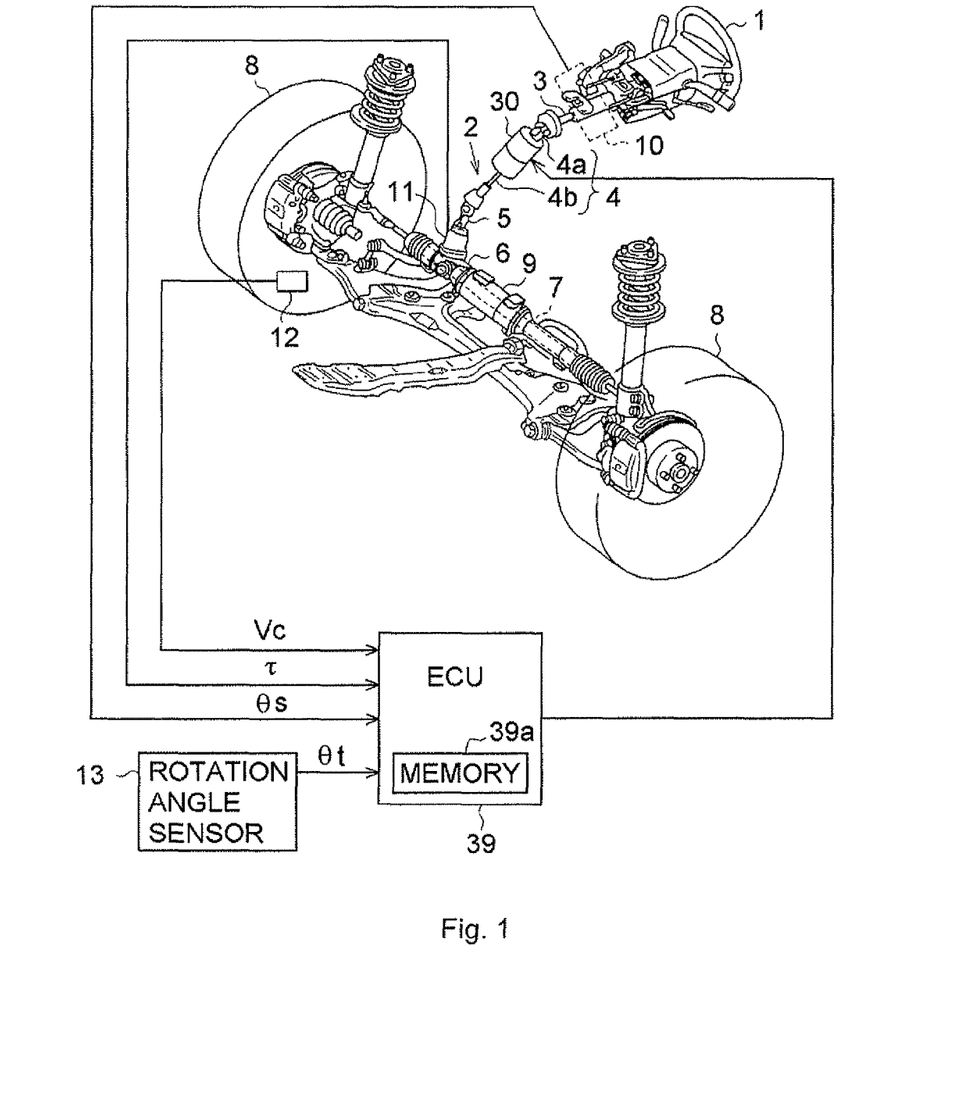
FIG. 1 is a view that schematically shows the configuration of an electric power steering system that is a vehicle steering system according to a first embodiment of the invention.

In the electric power steering system shown in FIG. 1, when a steering wheel 1 is operated by the driver, a steering shaft 2 rotates on the basis of a steering force. The steering shaft 2 is formed by sequentially coupling an intermediate shaft 4 and a pinion shaft 5 to a column shaft 3 coupled to the steering wheel 1. A gearbox 6 is coupled to a lower end portion of the pinion shaft 5. The gearbox 6 converts the rotation of the steering shaft 2 into the axial linear motion of the rack shaft 7. The linear motion of the rack shaft 7 is transmitted to steered wheels 8 via tie rods (not shown) coupled to respective ends of the rack shaft 7. As a result, the steered angle of the steered wheels 8, that is, the travel direction of the vehicle is changed.

The electric power steering system includes various sensors that are used to detect the operation amount of the steering wheel 1 and the state quantity of the vehicle. For example, a steering angle sensor 10 is provided on the column shaft 3. The steering angle sensor 10 detects a steering angle θs of the steering wheel 1. A torque sensor 11 is provided on the pinion shaft 5. The torque sensor 11 detects a torque τ that acts on the steering shaft 2. The vehicle includes a vehicle speed sensor 12 that detects a speed Vc of the vehicle.

In the electric power steering system, an electric motor 9 is provided on the rack shaft 7, and a driver's steering operation is assisted by applying torque from the electric motor 9 to the rack shaft 7. Specifically, a target assist force is set on the basis of the torque τ that is detected by the torque sensor 11 and the speed Vc of the vehicle, which is detected by the vehicle speed sensor 12. Current that is supplied to the electric motor 9 is subjected to feedback control such that an assist force that is applied from the electric motor 9 to the rack shaft 7 becomes a target assist force.

In the electric power steering system, the intermediate shaft 4 is split into a first shaft 4a that is coupled to the column shaft 3, and a second shaft 4b that is coupled to the pinion shaft 5. A variable transmission ratio mechanism 30 is provided between the first shaft 4a and the second shaft 4b. The variable transmission ratio mechanism 30 is able to change the transmission ratio between the first shaft 4a and the second shaft 4b.

Figure 2:
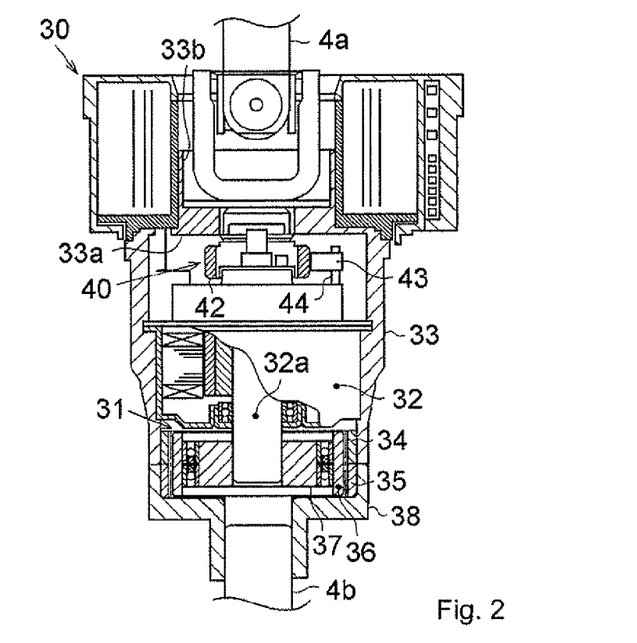
FIG. 2 is a sectional view that shows the sectional structure of a variable transmission ratio mechanism in the vehicle steering system according to the first embodiment.

As shown in FIG. 2, in the variable transmission ratio mechanism 30, a differential mechanism 31 and a motor 32 are accommodated in a housing 33 formed into a substantially closed-end cylindrical shape. A coupling portion 33b is formed on an upper wall portion 33a of the housing 33. The first shaft 4a is spline-connected to the coupling portion 33b. The housing 33 is coupled to the first shaft 4a via the coupling portion 33b so as to be rotatable together with the first shaft 4a. The motor 32 is fixed to the housing 33 such that a rotary shaft 32a of the motor 32 is coaxial with the central axis of the housing 33.

The differential mechanism 31 is a known wave motion gear mechanism that includes a pair of spline portions 34, 35, a spline portion 36 and a wave motion generator 37. The spline portions 34, 35 are coaxially arranged next to each other. The spline portion 36 is in mesh with the spline portions 34, 35, at a position radially inward of the spline portions 34, 35. The wave motion generator 37 rotates the meshing portion.

The first spline portion 34 is fixed to the inside of the housing 33 so as to be coaxial with the rotary shaft 32a of the motor 32. The second spline portion 35 is coupled to the second shaft 4b via a coupling member 38. The number of internal teeth of the first spline portion 34 and the number of internal teeth of the second spline portion 35 are set to different numbers from each other. The spline portion 36 is arranged radially inward of the spline portions 34, 35 while being deflected into an elliptical shape. The external teeth of the spline portion 36 are partially in mesh with the internal teeth of the spline portion 34 and the internal teeth of the spline portion 35. In the differential mechanism 31, when the first spline portion 34 rotates on the basis of the rotation of the housing 33, the rotation of the first spline portion 34 is transmitted to the second spline portion 35 and the coupling member 38 via the spline portion 36. In this way, the rotation of the first shaft 4a is transmitted to the second shaft 4b.

The wave motion generator 37 is arranged radially inward of the spline portion 36, and a center portion of the wave motion generator 37 is coupled to the rotary shaft 32a of the motor 32. Therefore, when the wave motion generator 37 rotates in accordance with the rotation of the motor 32, the meshing portion between the spline portion 36 and the spline portions 34, 35 rotates. At this time, due to the difference in the number of teeth between the first spline portion 34 and the second spline portion 35, and the second spline portion 35 rotates relative to the first spline portion 34. Thus, the rotation of the motor 32 is reduced in speed, and is then transmitted to the second shaft 4b. Thus, the sum of the rotation of the first shaft 4a and the rotation of the motor 32 is transmitted to the second shaft 4b. As a result, the transmission ratio between the first shaft 4a and the second shaft 4b is changed.

Figure 3:
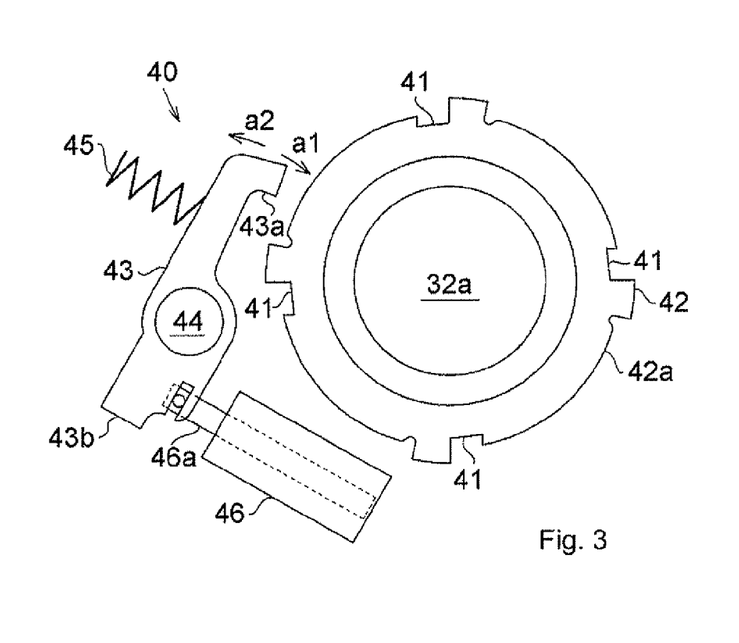
FIG. 3 is a plan view that shows the planar structure of a lock mechanism of the variable transmission ratio mechanism.

A lock mechanism 40 is provided on the upper face of the motor 32. The lock mechanism 40 restricts the operation of the variable transmission ratio mechanism 30 by mechanically restricting the rotation of the rotary shaft 32a. As shown in FIG. 3, the lock mechanism 40 includes an annular lock holder 42 and a lock bar 43. The lock holder 42 is fixed to one end of the rotary shaft 32a of the motor 32. The lock bar 43 is used to lock the rotation of the lock holder 42.

The lock holder 42 is arranged such that the central axis of the lock holder 42 is coaxial with the rotary shaft 32a of the motor 32. A plurality of engaging grooves 41 is formed in an outer periphery 42a of the lock holder 42. The lock bar 43 is engaged with one of the engaging grooves 41.

The lock bar 43 is arranged radially outward of the lock holder 42, and is pivotably supported by a rotary shaft 44 fixed to the upper face of the motor 32. A portion of the lock bar 43, which extends from a portion supported by the rotary shaft 44 to a distal end portion 43a, is urged by a spring member 45 in a direction toward the lock holder 42 (direction indicated by an arrow a1 in FIG. 3). A drive shaft 46a of an actuator 46 is coupled to a base end portion 43b of the lock bar 43. The actuator 46 applies torque, with which the lock bar 43 is moved in a direction away from the lock holder 42 (direction indicated by an arrow a2), to the lock bar 43, by retracting the drive shaft 46a through energization. While the actuator 46 is energized, the lock bar 43 is held at a location apart from the lock holder 42 against the urging force of the spring member 45.

At this time, because the rotary shaft 32a of the motor 32 is rotatable, it is possible to change the transmission ratio between the first shaft 4a and the second shaft 4b by driving the motor 32. On the other hand, when the actuator 46 is de-energized, the lock bar 43 is pivoted in the direction indicated by the arrow a1 by the urging force of the spring member 45. Therefore, the distal end portion 43a of the lock bar 43 contacts the outer periphery 42a of the lock holder 42. At this time, when the lock holder 42 rotates together with the rotary shaft 32a of the motor 32, the distal end portion 43a of the lock bar 43 is engaged with one of the engaging grooves 41, and the rotation of the lock holder 42 and rotary shaft 32a is restricted. As a result, the operation of the variable transmission ratio mechanism 30 is restricted, and the first shaft 4a is directly coupled to the second shaft 4b. Thus, deviation between the steering angle of the steering wheel 1 and the steered angle of the steered wheels 8 no longer occurs.

As shown in FIG. 1, the variable transmission ratio mechanism 30 is provided with a rotation angle sensor 13 that detects a rotation angle θt of the motor 32. An output from the rotation angle sensor 13 is input into an ECU 39 that comprehensively controls driving of the variable transmission ratio mechanism 30. Outputs from the steering angle sensor 10, the torque sensor 11 and the vehicle speed sensor 12 are also input into the ECU 39. The ECU 39 is mainly formed of a microcomputer that includes a memory 39a, and the like.

The ECU 39 executes drive control on the motor 32 of the variable transmission ratio mechanism 30 on the basis of the outputs from the steering angle sensor 10 and the vehicle speed sensor 12. Specifically, the ECU 39 computes an ACT command angle, which is a target value of an amount of rotation to be added to the rotation of the first shaft 4a, on the basis of the steering angle θs that is detected by the steering angle sensor 10 and the speed Vc of the vehicle, which is detected by the vehicle speed sensor 12. The ECU 39 computes an actual ACT angle, which is an amount of rotation actually added to the rotation of the first shaft 4a, on the basis of the rotation angle θt of the motor 32, which is detected by the rotation angle sensor 13. The ECU 39 controls the motor 32 in order to cause the actual ACT angle to follow the ACT command angle. Thus, the sum of the rotation of the first shaft 4a and the rotation of the motor 32 is transmitted to the second shaft 4b, and the transmission ratio between the first shaft 4a and the second shaft 4b is changed.

The ECU 39 executes drive control on the lock mechanism 40 of the variable transmission ratio mechanism 30 on the basis of the torque τ that is detected by the torque sensor 11. Specifically, the ECU 39 energizes the actuator 46 in normal times, and, when the ECU 39 detects reverse input torque on the basis of the torque τ that is detected by the torque sensor 11, the ECU 39 de-energizes the actuator 46. Hereinafter, the process of activating the lack mechanism 40 will be described in detail.

First, in the electric power steering system according to the present embodiment, for example, when one of the steered wheels 8 runs onto a curb while the vehicle is travelling and then an excess impact load is applied to the steered wheel 8, the impact load is transmitted as reverse input torque to the steering shaft 2 via the rack shaft 7. The reverse input torque is transmitted to the variable transmission ratio mechanism 30 via the pinion shaft 5 and the second shaft 4b of the intermediate shaft 4.

In the variable transmission ratio mechanism 30, as shown in FIG. 2, reverse input torque that acts on the second shaft 4b is transmitted to the rotary shaft 32a of the motor 32 via the coupling member 38, the second spline portion 35, the spline portion 36 and the wave motion generator 37. At this time, the motor 32 operates as described in the following 1) to 3) on the basis of the magnitude of reverse input torque that acts on the rotary shaft 32a. Note that, in the following 1) to 3), a motor operation limit torque τm1 indicates an upper limit of reverse input torque, at or below which the motor 32 is able to rotate the rotary shaft 32a in a regular command direction against the reverse input torque. A motor limit retaining torque τm2 (>τm1) indicates a lower limit of reverse input torque, at or above which the rotary shaft 32a is able to be rotated in a direction opposite to the regular command direction against the driving force of the motor 32.

1). The reverse input torque is lower than or equal to the motor operation limit torque τm1.
In this case, the rotary shaft 32a is able to rotate in the regular direction by the driving force of the motor 32.

2). The reverse input torque exceeds the motor operation limit torque τm1 and is lower than the motor limit retaining torque τm2.
In this case, the rotary shaft 32a is not able to rotate in the regular direction by the driving force of the motor 32, and is apparently stopped.

3). The reverse input torque is higher than or equal to the motor limit retaining torque τm2.
In this case, the rotary shaft 32a is rotated in a direction opposite to the regular direction by the reverse input torque.

Thus, if the lock mechanism 40 is activated by taking into account a delay in response before the reverse input torque that acts on the rotary shaft 32a of the motor 32 reaches the motor limit retaining torque τm2, it is possible to suppress a deviation between the steering angle of the steering wheel 1 and the steered angle of the steered wheel 8.

Next, the procedure of a process of activating the lock mechanism 40, which is executed by the ECU 39, will be described with reference to FIG. 4. The process shown in FIG. 4 is repeatedly executed at predetermined computation intervals Tc while the actuator 46 of the lock mechanism 40 is energized.

Figure 4:
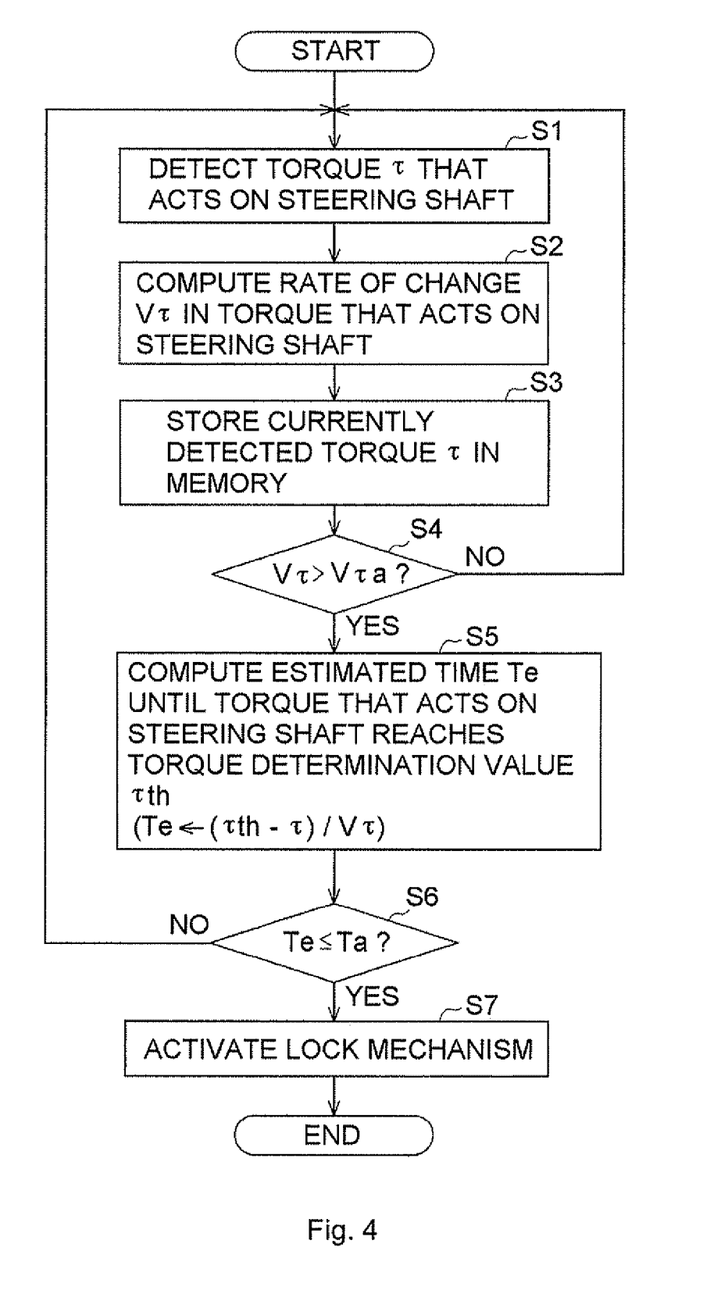
FIG. 4 is a flowchart that shows the procedure of a process of activating the lock mechanism in the vehicle steering system according to the first embodiment.

As shown in FIG. 4, the ECU 39 initially detects the torque τ that acts on the steering shaft 2 with the use of the torque sensor 11 (step S1), and computes a rate of change Vτ in the detected torque τ on the basis of the detected torque τ (step S2). In step S2, the ECU 39 obtains a difference between the torque detected step S1 of the current process and a torque detected in the immediately preceding process and stored in the memory 39a, and computes the rate of change Vτ in torque by dividing the difference by the computation interval Tc. Subsequently, in step S3, the ECU 39 stores the currently detected torque τ in the memory 39a. In the process shown in FIG. 4, step S3 is executed each time, and time-series data of the detected torque τ are stored in the memory 39a. Subsequently, in step S4, the ECU 39 determines whether the rate of change Vτ in the detected torque τ exceeds a predetermined rate Vτa. When the rate of change Vτ in the detected torque τ is lower than or equal to the predetermined rate Vτa (NO in step S4), the ECU 39 determines that no reverse input torque has been generated, after which the ECU 39 returns to step S1.

On the other hand, when the rate of change Vτ in the detected torque τ exceeds the predetermined rate Vτa (YES in step S4), the ECU 39 determines that reverse input torque has been generated, and computes an estimated time Te until the torque τ that acts on the steering shaft 2 reaches a torque determination value τth, on the basis of the rate of change Vτ in torque (step S5). The torque determination value τth is set to the above-described motor operation limit torque τm1. Specifically, in step S5, the ECU 39 computes the estimated time Te according to Equation 1 indicated below.

$$Te = (\tau th - \tau)/V\tau \qquad \text{Equation 1}$$

Subsequently, in step S6, the ECU 39 determines whether the estimated time Te is shorter than or equal to a predetermined period of time Ta. When the estimated time Te is shorter than or equal to the predetermined period of time Ta (YES in step S6), the ECU 39 activates the lock mechanism 40 (step S7). On the other hand, when the estimated time Te exceeds the predetermined period of time Ta (NO in step S6), the ECU 39 returns to step S1. The predetermined period of time Ta is set in advance through an experiment, or the like, as a period of time that corresponds to a delay in response of the lock mechanism 40.

Figure 5A:
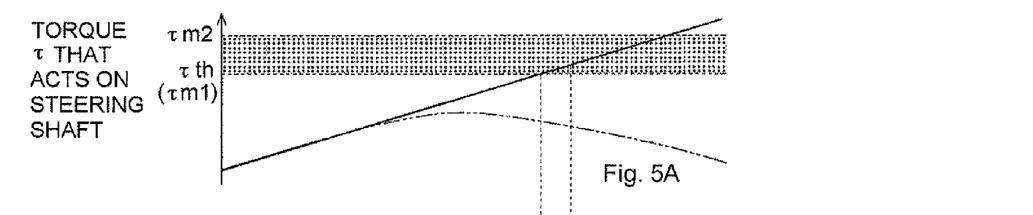
FIG. 5A to FIG. 5D are timing charts that show an example of the operation of the vehicle steering system according to the first embodiment.
Figure 5B:
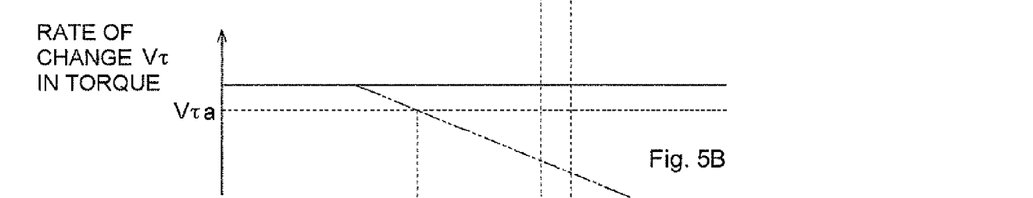
Figure 5C:
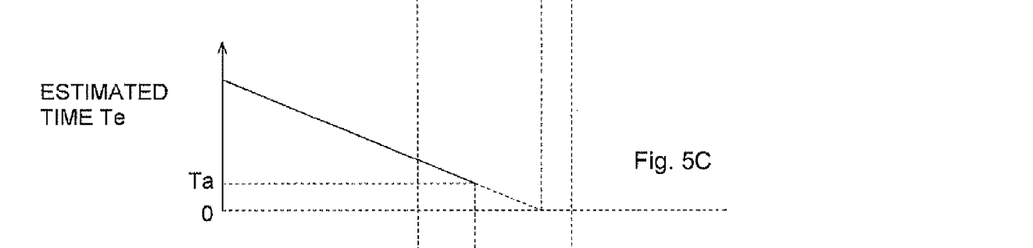

Next, an example of the operation of the electric power steering system according to the present embodiment will be described with reference to FIG. 5A to FIG. 5D. As shown in FIG. 5A, for example, if an excess impact load is applied to one of the steered wheels 8 and therefore reverse input torque acts on the steering shaft 2 at time t0, the torque τ that acts on the steering shaft 2 starts increasing at time t0. As shown in FIG. 5B, when the rate of change Vτ in the torque τ exceeds the predetermined rate Vτa, the ECU 39 detects the reverse input torque. As shown in FIG. 5C, the ECU 39 computes the estimated time Te until the torque τ that acts on the steering shaft 2 reaches the torque determination value τth, on the basis of the rate of change Vτ in the torque τ. Note that, at time t0, the computed estimated time Te is longer than the predetermined period of time Ta. Therefore, as shown in FIG. 5D, the lock mechanism 40 is not activated.

Figure 5D:
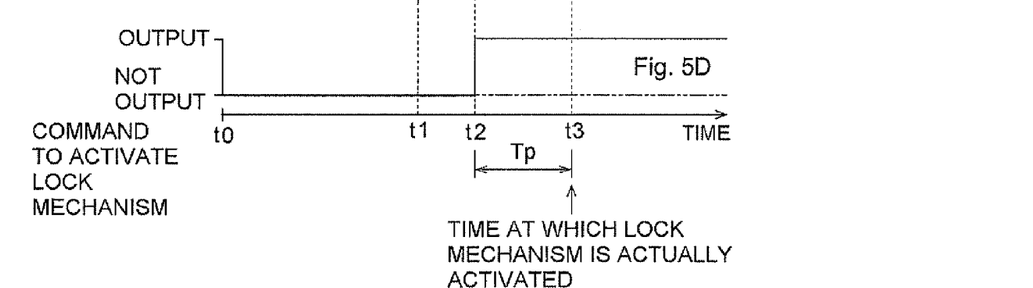

After that, as shown in FIG. 5C, when the computed estimated time Te reduces to the predetermined period of time Ta at time t2, the ECU 39 outputs a command to activate the lock mechanism 40 at time t2 as shown in FIG. 5D. In the present embodiment, the predetermined period of time Ta is set by taking into account a delay in response of the lock mechanism 40. Therefore, even when there is a time lag of a period of time Tp due to a delay in response of the lock mechanism 40, from time t2 to time t3 at which the rotation of the motor 32 is actually restricted, it is possible to restrict the rotation of the motor 32 before the torque τ reaches the motor limit retaining torque τm2. Specifically, it is possible to restrict the rotation of the motor 32 when the torque τ that acts on the steering shaft 2 falls within the range of "τth<τ<τm2" indicated by dot hatching in FIG. 5A. That is, it is possible to activate the lock mechanism 40 before the motor limit retaining torque τm2 acts on the rotary shaft 32a of the motor 32. Thus, with the electric power steering system according to the present embodiment, a deviation between the steering angle of the steering wheel 1 and the steered angle of the steered wheels 8 due to a delay in response of the lock mechanism 40 is suppressed, whereby the drivability of the vehicle is improved.

On the other hand, as indicated by the long dashed double-short dashed line in FIG. 5A, when the torque τ that acts on the steering shaft 2 decreases before it reaches the torque determination value τth, the rate of change Vτ in torque becomes lower than or equal to the predetermined rate Vτca at time t1 as indicated by the long dashed double-short dashed line in FIG. 5B. In this case, as indicated by the long dashed double-short dashed line in FIG. 5D, the ECU 39 does not output a command to activate the lock mechanism 40. That is, even when reverse input torque is detected on the basis of the rate of change Vτ in the detected torque τ, the lock mechanism 40 is not activated in a situation where the motor limit retaining torque τm2 does not act on the motor 32. As a result, in the electric power steering system according to the present embodiment, occurrence of an erroneous operation of the lock mechanism 40 is suppressed.

As described above, with the electric power steering system according to the present embodiment, the following advantageous effects are obtained.

(1) In the electric power steering system according to the present embodiment, when the rate of change Vτ in torque that acts on the steering shaft 2 exceeds the predetermined rate Vτa, the time Te until the torque that acts on the steering shaft 2 reaches the torque determination value τth is estimated on the basis of the rate of change Vτ in torque. On the condition that the estimated time Te is shorter than or equal to the predetermined period of time Ta, the rotation of the motor 32 is restricted by the lock mechanism 40. By setting the predetermined period of time Ta by taking into account a delay in response of the lock mechanism 40, it is possible to suppress a deviation between the steering angle of the steering wheel 1 and the steered angle of the steered wheels 8 due to a delay in response of the lock mechanism 40. Therefore, the drivability of the vehicle improves. The rotation of the motor 32 is not restricted by the lock mechanism 40 in a situation where the motor limit retaining torque τm2 does not act on the motor 32. Therefore, it is possible to suppress occurrence of an erroneous operation of the lock mechanism 40. Furthermore, it is possible to reduce a load on the motor 32. Therefore, it is possible to reduce the size and cost of the motor 32.

(2) The torque determination value τth is set to the motor operation limit torque τm1, in other words, the upper limit of reverse input torque at or below which the motor 32 is able to rotate in the regular direction against the reverse input torque. Thus, before the motor limit retaining torque τm2 acts on the motor 32, that is, before the rotary shaft 32a of the motor 32 starts rotating in a direction opposite to the regular direction due to reverse input torque, it is possible to reliably restrict the rotation of the motor 32 with the use of the lock mechanism 40. Therefore, it is possible to further reliably suppress a deviation between the steering angle of the steering wheel 1 and the steered angle of the steered wheels 8 due to a delay in response of the lock mechanism 40.

Subsequently, a second embodiment of the invention will be described. The basic configuration of an electric power steering system according to the second embodiment is similar to that of the electric power steering system illustrated in FIG. 1.

The ECU 39 according to the present embodiment differs from that in the first embodiment in that, when the rate of change Vτ in the torque τ that is detected by the torque sensor 11 is lower than or equal to the predetermined rate Vτa, an acceleration Aτ of the change in the torque τ is obtained. In the present embodiment, the acceleration Aτ of the change in the torque τ is used as a torque parameter that indicates a manner of change in the torque in addition to the rate of change Vτ in the torque τ. A period of time until the motor operation limit torque τm1 acts on the motor 32 is estimated on the basis of the acceleration Aτ of the change in the torque τ. When the estimated time is shorter than or equal to the predetermined period of time Ta, the rotation of the motor 32 is restricted with the use of the lock mechanism 40. Hereinafter, the details will be described with reference to FIG. 6, FIG. 7 and FIG. 8A to FIG. 8D. First, the procedure of activating the lock mechanism 40, which is executed by the ECU 39, will be described with reference to FIG. 6. In this process, the same step numbers as those in FIG. 4 denote the same steps as those illustrated in FIG. 4, and the description thereof is omitted. Hereinafter, the difference will be mainly described.

Figure 6:
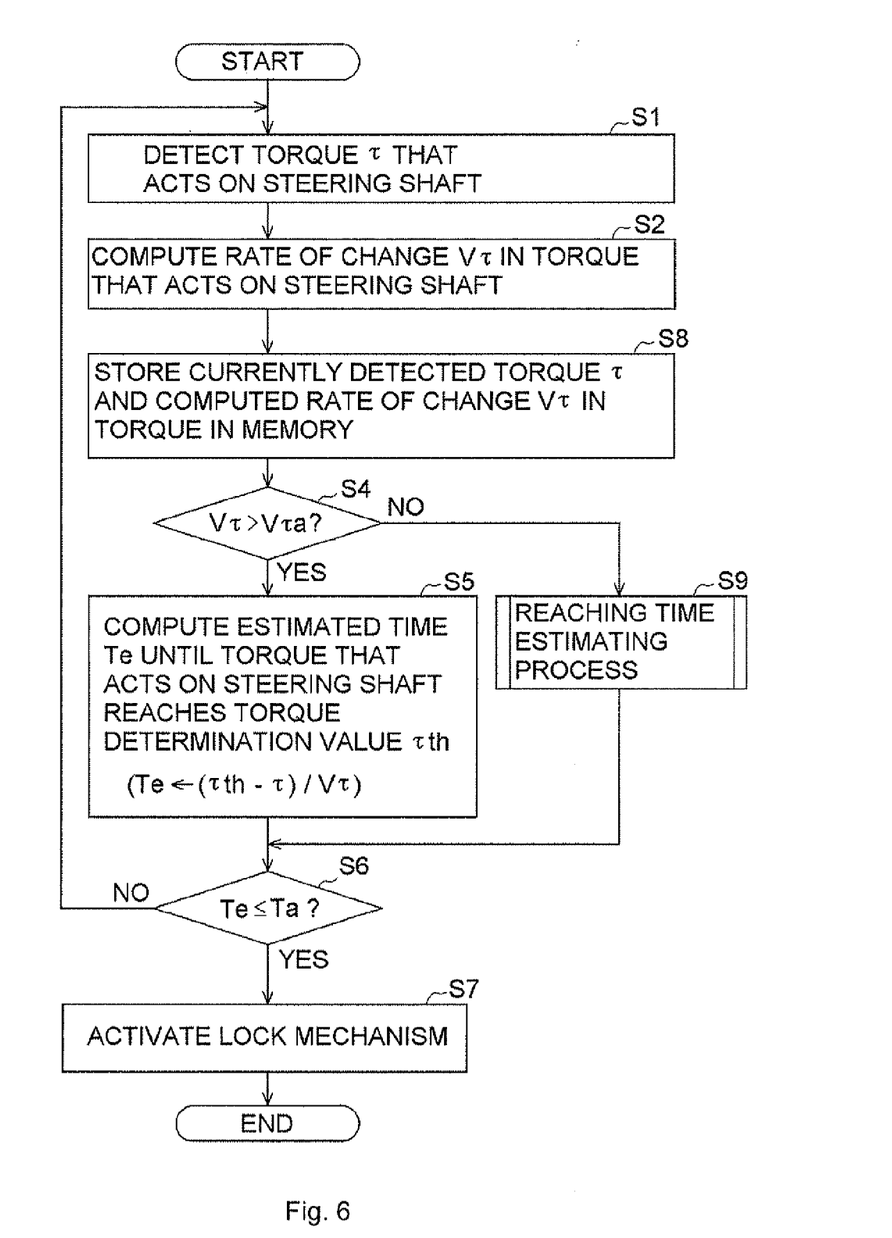
FIG. 6 is a flowchart that shows the procedure of a process of activating a lock mechanism in a vehicle steering system according to a second embodiment of the invention.

As shown in FIG. 6, the ECU 39 computes the rate of change Vτ in the torque τ that acts on the steering shaft 2 (step S2), and then stores the currently detected torque τ and the computed rate of change Vτ in the torque τ in the memory 39a (step S8). In the process shown in FIG. 6, step S8 is executed each time. Therefore, time-series data of each of the torque τ and the rate of change Vτ are stored in the memory 39a. Subsequently, in step S4, the ECU 39 determines whether the rate of change Vτ in the torque τ exceeds the predetermined rate Vτa. When the rate of change Vτ in the torque τ is lower than or equal to the predetermined rate Vτa (NO in step S4), the ECU 39 executes reaching time estimating process (step S9).

Figure 7:
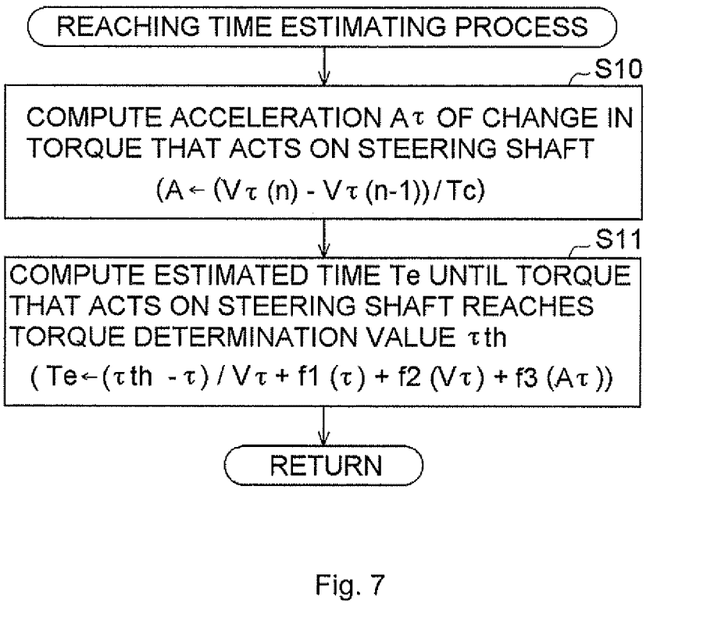
FIG. 7 is a flowchart that shows the procedure of a reaching time estimating process in the vehicle steering system according to the second embodiment.

As shown in FIG. 7, in the reaching time estimating process, the ECU 39 initially computes the acceleration Aτ of the change in the torque τ that acts on the steering shaft 2 (step S10). Specifically, the acceleration Aτ of the change in torque that acts on the steering shaft 2 is computed according to Equation 2 indicated below.

$$A\tau = (V\tau(n) - V\tau(n-1))/Tc \qquad \text{Equation 2}$$

In Equation 2, (n) denotes a current value, and (n−1) denotes a value in the immediately preceding process.

Subsequently, in step S11, the ECU 39 computes the estimated time Te until the torque τ that acts on the steering shaft 2 reaches the torque determination value τth on the basis of the torque τ that acts on the steering shaft 2, the rate of change Vτ in the torque τ and the acceleration Aτ of the change in the torque τ. Specifically, the estimated time Te is computed according to Equation 3 indicated below.

$$Te = (\tau th - \tau)/V\tau + f1(\tau) + f2(V\tau) + f3(A\tau) \qquad \text{Equation 3}$$

A first function f1(τ) that uses the torque τ as a variable, a second function f2(Vτ) that uses the rate of change Vτ in the torque τ as a variable, and a third function f3(Aτ) that uses the acceleration Aτ of the change in the torque τ as a variable may be defined, for example, as Equations 4 to 6 indicated below. B1, B2, C1, C2, D1 and D2 are constants, and are set in advance through an experiment, or the like, such that it is possible to compute the estimated time Te until the torque that acts on the steering shaft 2 reaches the torque determination value τth.

$$f1(\tau) = B1 \times \tau^2 + B2 \qquad \text{Equation 4}$$

$$f2(V\tau) = C1 \times V\tau^2 + C2 \qquad \text{Equation 5}$$

$$f3(A\tau) = D1 \times A\tau^2 + D2 \qquad \text{Equation 6}$$

After the estimated time Te is computed in this way, the ECU 39 determines in step S6 shown in FIG. 6 whether the estimated time Te is shorter than or equal to the predetermined period of time Ta. When the estimated time Te is shorter than or equal to the predetermined period of time Ta (YES in step. S6), the rotation of the motor 32 is restricted by the lock mechanism 40 (step S7).

Figure 8A:
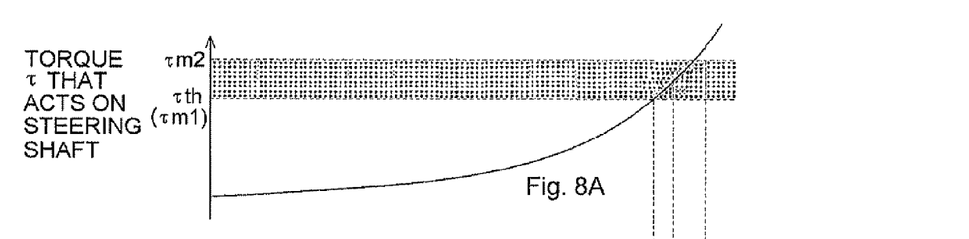
FIG. 8A to FIG. 8D are timing charts that show an example of the operation of the vehicle steering system according to the second embodiment.
Figure 8B:
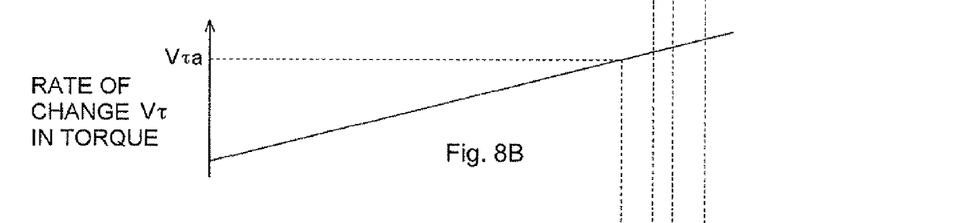

Next, an example of the operation of the electric power steering system according to the present embodiment will be described with reference to FIG. 8A to FIG. 8D. As shown in FIG. 8A, for example, if an excess impact load is applied to one of the steered wheels 8 and reverse input torque acts on the steering shaft 2 at time t10, the torque τ that acts on the steering shaft 2 steeply increases so as to be proportional to the exponentiation of an elapsed time. In this case, the ECU 39 according to the first embodiment computes the estimated time Te at time t12 at which the rate of change Vτ in the torque τ exceeds the predetermined rate Vτa. However, when an increase in the torque τ is steep as in the present embodiment, the estimated time Te computed at time t12 may be already shorter than the predetermined period of time Ta time t12. In this case, as shown in FIG. 8D, the ECU 39 issues a command to activate the lock mechanism 40 at time t12. However, due to a time lag caused by a delay in response of the lock mechanism 40, the time point at which the lock mechanism 40 is actually activated is time t14 at which the predetermined period of time Tp has elapsed from time t12. Therefore, the response of the lock mechanism 40 does not catch up with the rate of increase in the torque τ that acts on the steering shaft 2. This may cause a possibility that the rotation of the motor 32 will be restricted only after the torque τ that acts on the motor 32 exceeds the motor limit retaining torque τm2.

Figure 8C:
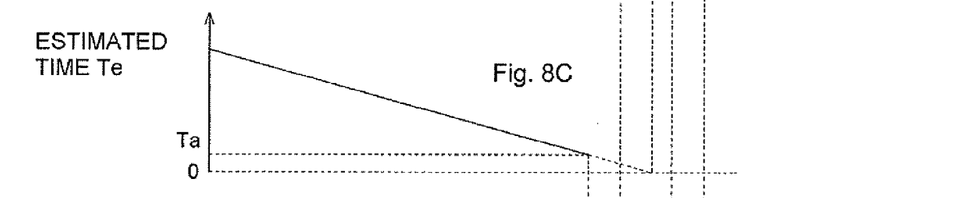
Figure 8D:
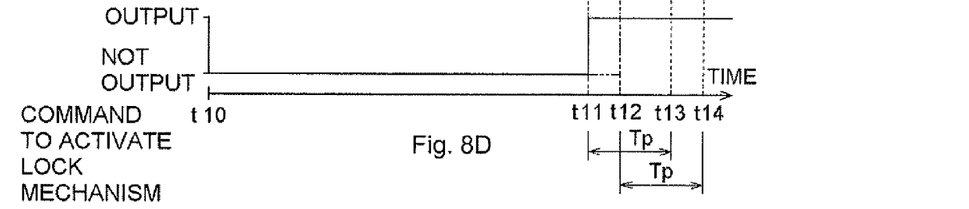

In this respect, the ECU 39 according to the present embodiment computes the estimated time Te as shown in FIG. 8C on the basis of the torque τ that acts on the steering shaft 2, the rate of change Vτ in the torque τ and the acceleration Aτ of the change in the torque τ within a period in which the rate of change Vτ in the torque τ is lower than or equal to the predetermined rate Vτa, that is, a period from time t10 to time t12. The number of parameters used in this computation is larger than that used in the computation of the estimated time Te in the first embodiment. Therefore, it is possible to further accurately estimate the estimated time Te. Therefore, when the estimated time Te reaches the predetermined period of time Ta at time t11 at which the rate of change Vτ in the torque τ is not higher than the predetermined rate Vτa, the ECU 39 outputs a command to activate the lock mechanism 40 as shown in FIG. 8D. By so doing, even when reverse input torque that acts on the steering shaft 2 steeply increases so as to be proportional to the exponentiation of an elapsed time, it is possible to restrict the rotation of the motor 32 by activating the lock mechanism 40 when the torque τ that acts on the steering shaft 2 is within the range of "τth<τ<m2" indicated by the dot hatching in FIG. 8A. That is, before the motor limit retaining torque τm2 acts on the motor 32, it is possible to restrict the rotation of the motor 32 by actually activating the lock mechanism 40. Thus, it is possible to further improve the drivability of the vehicle by further reliably suppressing a deviation between the steering angle of the steering wheel 1 and the steered angle of the steered wheels 8 due to a delay in response of the lock mechanism 40.

As described above, with the electric power steering system according to the present embodiment, in addition to the advantageous effects described in (1) and (2) according to the first embodiment, the following advantageous effects are obtained.

(3) When the rate of change Vτ in the torque τ that acts on the steering shaft 2 is lower than or equal to the predetermined rate Vτa, the acceleration Aτ of the change in the torque τ is obtained. In addition, the period of time Te until the torque τ reaches the torque determination value τth is estimated on the basis of the obtained acceleration Aτ. The rotation of the motor 32 is restricted with the use of the lock mechanism 40 on the condition that the estimated time Te is shorter than or equal to the predetermined period of time Ta. Thus, it is possible to activate the lock mechanism 40 by further reliably grasping the situation where reverse input torque that exceeds the torque determination value τth acts on the steering shaft 2. Therefore, it is possible to further improve the drivability of the vehicle by further reliably suppressing a deviation between the steering angle of the steering wheel 1 and the steered angle of the steered wheels 8.

Note that the above-described embodiments may be modified into the following alternative embodiments.

In the above-described second embodiment, the acceleration Aτ of the change in the torque τ is used as a torque parameter that indicates a manner of change in the torque τ, in addition to the rate of change Vτ in the torque τ that acts on the steering shaft 2. Alternatively, for example, a tendency of change in the torque τ that acts on the steering shaft 2 may be detected and the detected tendency may be used as a torque parameter. In this case, the estimated time until the torque τ reaches the torque determination value τth is computed by performing pattern matching for comparing the detected tendency of change in the torque τ and a change pattern prepared in advance. With such a method as well, it is possible to appropriately detect whether the torque that exceeds the torque determination value τth acts on the steering shaft 2.

In the above-described embodiments, the torque determination value τth is set to the motor operation limit torque τm1. However, as long as a value is lower than the motor limit retaining torque τm2, the torque determination value τth may be set to any value.

The rotation of the motor 32 may be restricted by the lock mechanism 40 on the condition that the rate of change V$\tau$ in the torque $\tau$ that acts on the steering shaft 2 exceeds the predetermined rate V$\tau$a. In this case, in the process illustrated in FIG. 4, step S5 and step S6 need to be omitted.

In the above-described embodiments, the torque sensor 11 of the electric power steering system is used as the torque detecting unit that detects the torque that acts on the steering shaft 2. However, the invention is not limited to this configuration. For example, instead of the torque sensor 11, another torque sensor may be provided. Alternatively, arrangement of the torque sensor 11 may be changed as needed. In addition, the torque that acts on the steering shaft may be estimated from a current value of the electric motor 9 of the electric power steering system. In short, any configuration may be employed as long as it is possible to detect the torque that acts on the steering shaft 2.

In the above-described embodiments, the variable transmission ratio mechanism 30 is provided on the intermediate shaft 4. Alternatively, for example, the variable transmission ratio mechanism 30 may be provided on the column shaft 3 or the pinion shaft 5.

In the above-described embodiments, the power steering system utilizes the driving force of the electric motor 9 as assist force, that is, the power steering system is the so-called electric power steering system. Alternatively, the power steering system may be, for example, a hydraulic power steering system that utilizes hydraulic pressure as assist force.

The power steering system according to the above-described embodiments is configured such that assist force of the electric motor 9 is applied to the rack shaft 7. However, assist force may be applied to any portion in a steering transmission system. For example, the power steering system may be configured such that assist force is applied to the pinion shaft 5 or the column shaft 3.

What is claimed is:

1. A vehicle steering system, comprising:
    a variable transmission ratio mechanism that is able to change a transmission ratio between a first shaft on a steering wheel side and a second shaft on a steered wheel side by adding rotation of a motor to rotation of the first shaft and transmitting a sum of the rotation of the motor and the rotation of the first shaft to the second shaft;
    a lock mechanism that mechanically restricts the rotation of the motor;
    a torque detecting unit that detects a torque that acts on the first shaft or the second shaft; and
    a control unit that restricts the rotation of the motor with use of the lock mechanism when a rate of change in the detected torque exceeds a predetermined rate;
    wherein, when a value lower than a lower limit of reverse input torque that is able to rotate the motor in a direction opposite to a regular rotation direction against driving force of the motor is set as a torque determination value, if the rate of change in the detected torque exceeds the predetermined rate, the control unit estimates a period of time until the detected torque reaches the torque determination value, based on the rate of change in the torque, and restricts the rotation of the motor with the use of the lock mechanism on condition that the estimated period of time is shorter than or equal to a predetermined period of time.

2. The vehicle steering system according to claim 1, wherein the torque determination value is set to an upper limit of reverse input torque at which the motor is able to rotate in the regular rotation direction against the reverse input torque.

3. The vehicle steering system according to claim 1, wherein the control unit obtains a torque parameter that indicates a manner of change in the detected torque, in addition to the rate of change in the detected torque, estimates the period of time until the detected torque reaches the torque determination value, based on the torque parameter, and restricts the rotation of the motor with the use of the lock mechanism on condition that the estimated period of time is shorter than or equal to the predetermined period of time.

4. The vehicle steering system according to claim 3, wherein the control unit obtains an acceleration of change in the detected torque as the torque parameter.

* * * * *